B. F. Alexander

Apple Parer,

No. 50,671.

Patented Oct. 31, 1865.

Witnesses:
Chas. D. Smith
Jno. L. Ewin

Inventor:
B. F. Alexander
By [Attorney]

UNITED STATES PATENT OFFICE.

BENJAMIN F. ALEXANDER, OF GLEN HOPE, PENNSYLVANIA.

MACHINE FOR PRESSING BEEF STEAK, PARING APPLES, AND SHARPENING KNIVES.

Specification forming part of Letters Patent No. 50,671, dated October 31, 1865.

*To all whom it may concern:*

Be it known that I, BENJAMIN F. ALEXANDER, of Glen Hope, Fairfield county, Pennsylvania, have invented a new and useful combined machine, which consists of an apple-parer, steak-tenderer, and knife-sharpener combined; and I do hereby declare the following to be a full, clear, and exact description of the nature, construction, and operation of the same, sufficient to enable one skilled in the art to which it appertains to construct and use the same, reference being had the accompanying drawings, which are made part of this specification, and in which—

Figure 2:
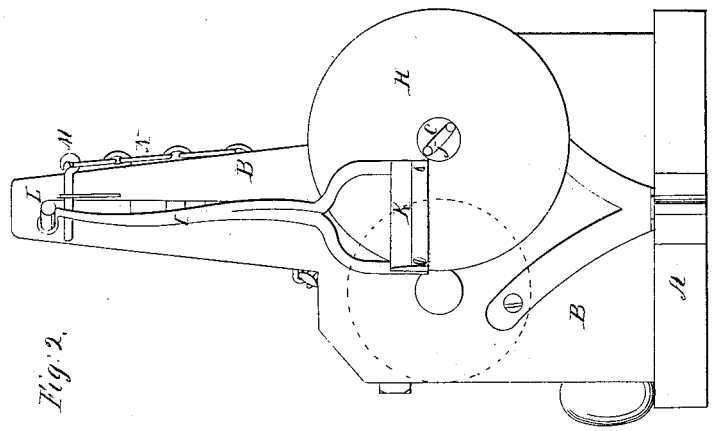
Figure 1:
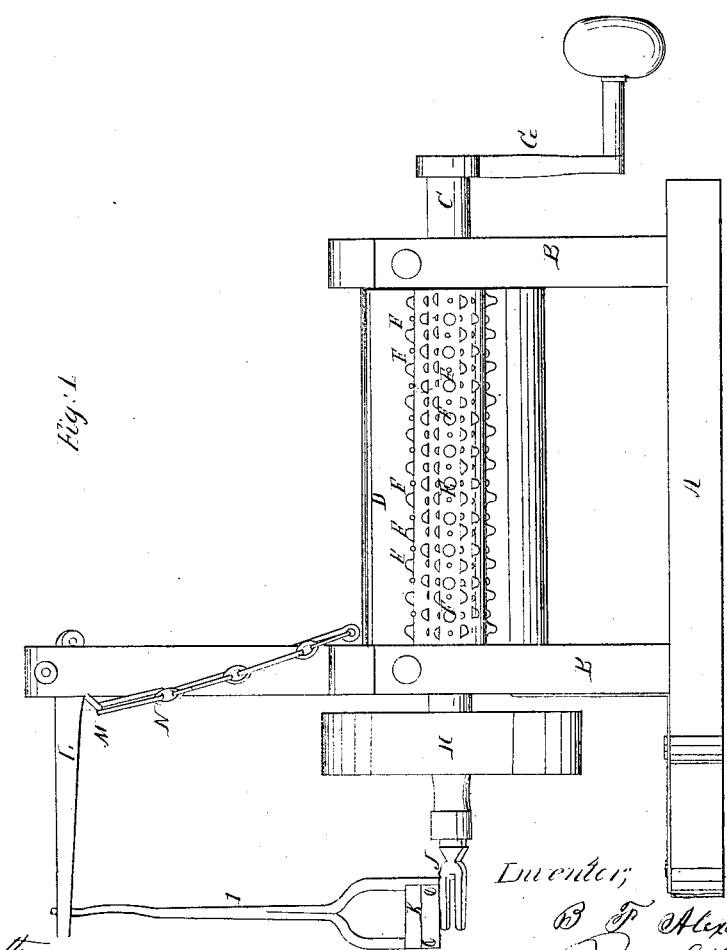

Figure 1 is a side elevation of the machine, and Fig. 2 is an elevation.

The invention consists of an apple-parer, steak-tenderer, and knife-sharpener combined in one machine.

A is the bed-plate or sill; B B', the standard, in which are journaled the shaft C and the roller D.

On the shaft C is a roller, E, whose periphery is covered with knobs, ribs, or projections F F F, for the purpose of bruising and tendering the steak when it is passed between the rollers D E, when the crank G is rotated.

On the shaft C, outside of the standard B, is a drum, H, which has upon it a coating of emery or grit, so as to constitute it a surface for sharpening knives, they being held against it while the shaft C is rotated.

On the end of the shaft C is a fork, J, on which to place an apple to be pared, and the knife K, of ordinary character, for this purpose is suspended by a rod, I, from an adjustable arm, L, which is pivoted in the standard B, the required height being obtained by means of the set-pin M, which is confined to the standard by a chain, N, and is capable of being set at various heights in the plate.

The apple being placed on the fork J, the knife is held against it in such a manner as to remove the peel, the peculiar circular manipulations of the knife, so as to present the edge to the apple, being familiar, do not require special detailed description.

Having described my invention, what I claim therein as new, and desire to secure by Letters Patent, is—

The combined machine consisting of an apple-parer, steak-tenderer, and knife-sharpener, arranged and constructed as described and represented.

The above specification of my combined beef-presser, apple-parer, and knife-sharpener signed this 7th day of September, 1865.

BENJN. F. ALEXANDER.

Witnesses:
ALEXR. A. C. KLAUCKE,
EDWARD H. KNIGHT.